United States Patent [19]
Peng et al.

[11] Patent Number: 5,712,720
[45] Date of Patent: Jan. 27, 1998

[54] LENS SWITCHING APPARATUS FOR DUAL-LENS OPTICAL SCANNER

[75] Inventors: Henry Peng; Kevin Yang, both of Hsinchu, Taiwan

[73] Assignee: Umax Data Systems Inc., Hsinchu, Taiwan

[21] Appl. No.: 773,724

[22] Filed: Dec. 16, 1996

[51] Int. Cl.$^6$ .................................................. G02B 26/08
[52] U.S. Cl. ........................... 359/210; 359/672; 355/55
[58] Field of Search .................................. 359/210, 672, 359/813, 814; 355/55.4, 42; 358/474, 483; 250/234, 235

[56] References Cited

U.S. PATENT DOCUMENTS 4,607,949  8/1986  Hakamada et al. ..................... 355/40

*Primary Examiner*—James Phan
*Attorney, Agent, or Firm*—W. Wayne Liauh

[57] ABSTRACT

A lens switching apparatus for a dual-lens optical scanner includes a base, a plurality of magnetic elements, a plurality of electromagnetic elements, a guiding assembly and a slide block. Two optical lens with different magnification are mounted on the slide block. The slide block may be moved and positioned in one direction when one of the electromagnetic element attracting one adjacent magnetic element while another electromagnetic element repulsive another adjacent magnetic element. The dual-lens mounted on the slide block thus can be switched as desired for scanning process.

5 Claims, 3 Drawing Sheets

LENS SWITCHING APPARATUS FOR DUAL-LENS OPTICAL SCANNER

BACKGROUND OF THE INVENTION

1. Field of the Invention

The present invention relates to a lens switching apparatus for an optical scanner, and more particularly to an improvement on lens switching mechanism for a dual-lens optical scanner.

2. Brief Description of the Prior Art

The principle of an optical scanner is to convert light of an object into image, and then using a Charge-Coupled Device (CCD) to convert the image into digital signal for computer storing or processing. In order to meet different resolution requirement, a scanner is usually equipped with two optical lenses with different magnification (i.e. amplifying ratio). Each of the lenses can be switched to a pre-set optical path of the CCD to scan the object with desired resolution.

The conventional lens switching mechanism for this purpose mainly includes a driving motor and a transmission assembly such as chain, belt or gear set. It is found that the conventional lens switching mechanism has the following disadvantages:

a. The positioning of the optical lens cannot be controlled precisely. Therefore it needs some other devices, such as position detecting sensor, to make the lens position accurate.

b. There are a lot of components involved, e.g. the motor, chain, belt, gear and sensor, etc. It is complicated, difficult to produce and assemble, and expensive.

SUMMARY OF THE INVENTION

In view of the aforesaid disadvantages, it is therefore the primary object of the present invention to provide a lens switching apparatus for scanner that is simple in structure, containing small number of parts, able to produce and assemble quickly and less expensive.

The other object of the present invention is to provide an improved lens switching apparatus for dual-lens optical scanner. In accordance with a preferred embodiment of the present invention, there is provided with a slide block for mounting two optical lens thereon. The slide block is moveable on a base of the scanner under control.

The other object of the present invention is to provide a lens switching apparatus for dual-lens optical scanner by using magnetic element driving approach. The lens switching apparatus includes a plurality of magnetic elements arranged on side walls of the slide block. Further, a plurality of electromagnetic elements are arranged on the side walls of the base corresponding to the magnetic elements of the slide block respectively. In such an arrangement, the slide block can be moved by means of the attraction and repulsive force between the magnetic elements and the electromagnetic elements to a desired position.

Another object of the present invention is to provide a lens switching apparatus with a guide means for guiding the slide block, so that the slide block can be moved smoothly on a concave section formed between two side walls of the base.

BRIEF DESCRIPTION OF THE DRAWINGS

The foregoing features of the present invention may be more fully understood from the following detailed description, read in conjunction with the accompanying drawings, wherein.

DETAILED DESCRIPTION OF THE PREFERRED EMBODIMENT

Figure 1:
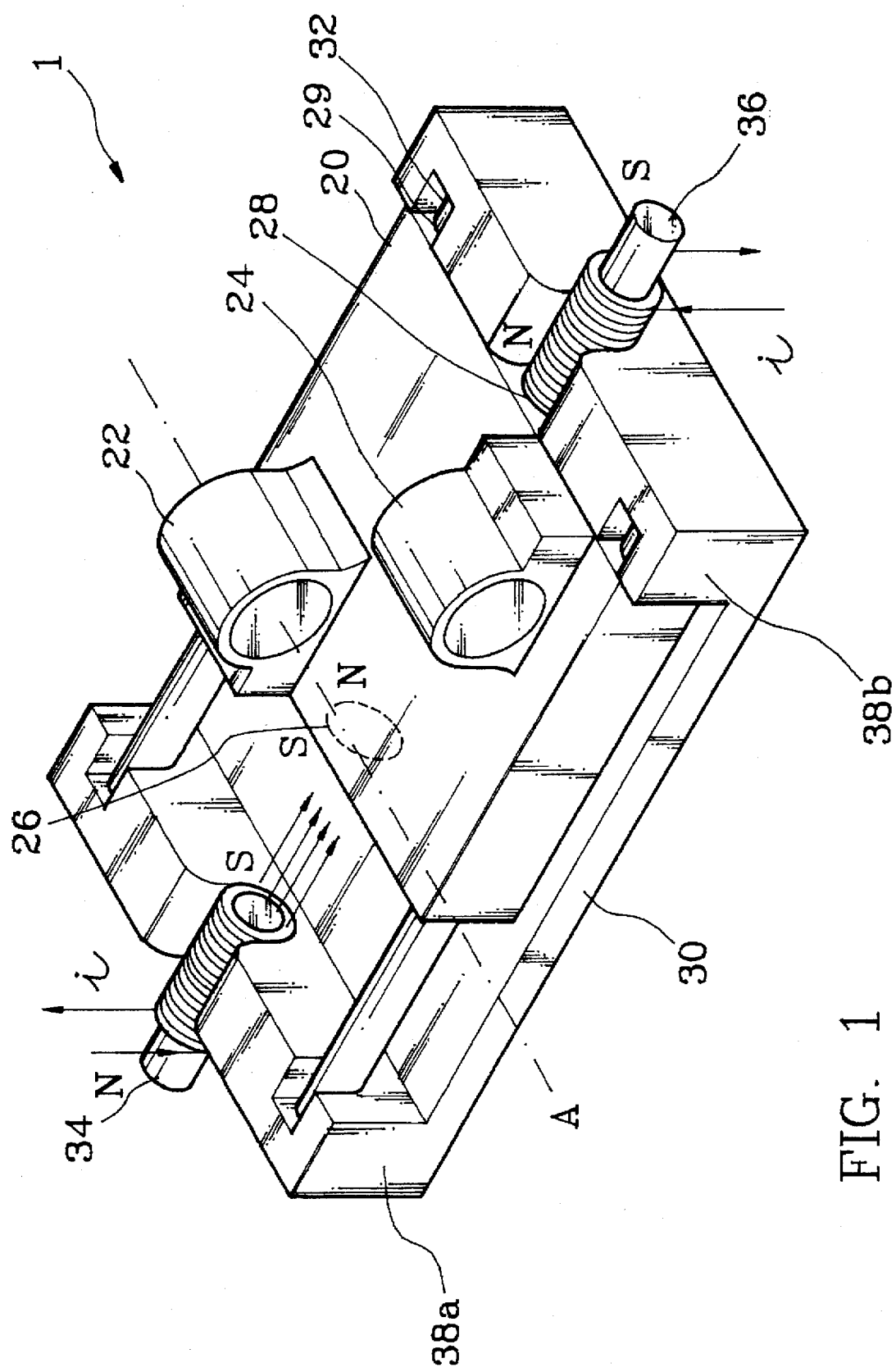
FIG. 1 is a perspective view of this invention.

Referring to FIG. 1, the lens switching apparatus according to this invention mainly includes a slide block 20, a base 30, a first magnetic element 26, a second magnetic element 28, two guide rods 32, a first electromagnetic element 34 and a second electromagnetic element 36.

The base 30 is equipped with two side walls 38a and 38b and a concave section formed between the side walls 38a and 38b, so that the slide block 20 may be moved on the concave section of the base 30. The first lens 22 and the second lens 24 are mounted on the slide block 20. As shown in FIG. 1, the optical paths of the first lens 22 and the second lens 24 are different. The first magnetic element 26 and the second magnetic element 28 are mounted respectively in two opposite sides of the slide block 20. The slide block 20 also has two through holes 29 transversely formed therein allowing the guide rods 32 to run through. The guide rods 32 are further arranged to cross two side walls 38a and 38b of the base 30. In such an arrangement, the slide block 20 thus may be slided transversely between two side walls 38a and 38b of the base 30 along the guide rods 29.

In the middle section of the side walls 38a and 38b, and corresponding to the positions of the magnetic elements 26 and 28, there are provided respectively with the electromagnetic elements 34 and 36. The magnetic polarity of the electromagnetic elements 34 and 36 may be changed when electric current is flowed in opposite direction. In a preferred embodiment of the present invention, the first electromagnetic element 34 may be actuated to generate a magnetic attraction force to the first magnetic element 26, while the second electromagnetic element 36 is actuated to generate a magnetic repulsive force against the second magnetic element 28. Therefore a push and pull magnetic force applying to the slide block 20 will move the slide block 20 transversely from one side wall of the base 30 to another side wall thereof. The first lens 22 or the second lens 24 thus may be moved and positioned to an operative position A for scanning process.

Figure 2:
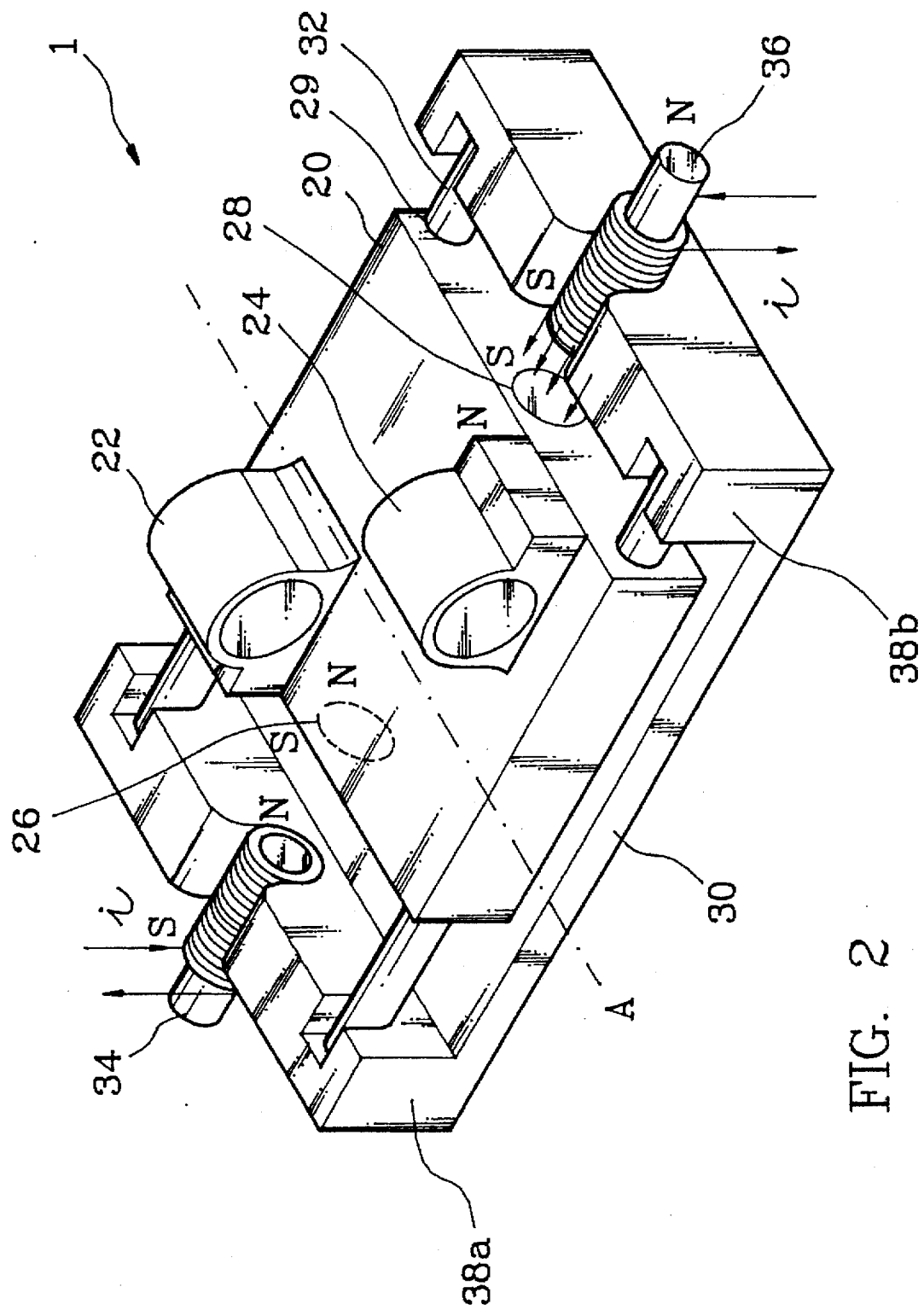
FIG. 2 is a perspective view of this invention amid a switching process.
Figure 3:
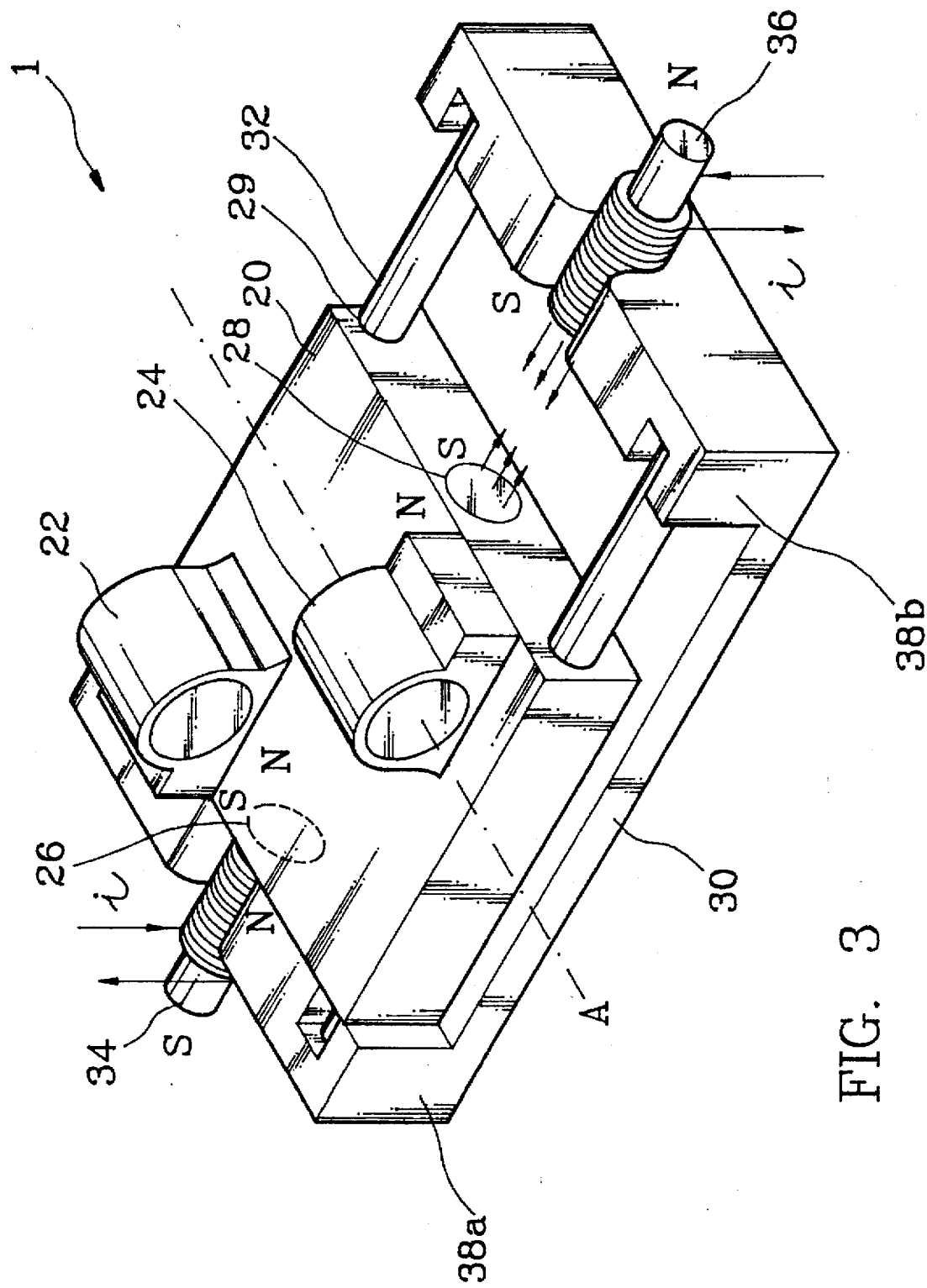
FIG. 3 is a perspective view of this invention after lens switching process completed.

FIGS. 1, 2, and 3 show examples of this invention at different operation stages. At first, the slide block 20 is located adjacent the right side wall 38b of the base 30. The first lens 22 is at operative state with its optical path aligning with the focusing optical path A of the CCD (not shown in the figures) of an optical scanner.

The first electromagnetic element 34 and the first magnetic element 26 have repulsive force between them, while the second electromagnetic element 36 and the second magnetic element 28 have attraction force between them. Therefore the slide block 20 and the first lens 22 can be securely held and positioned for scanning process.

When the direction of supplying electric current for the first electromagnetic element 34 and the second electromagnetic element 36 is changed at the same time, attraction force will incur between the first electromagnetic element 34 and the first magnetic element 26, while repulsive force will incur between the second electromagnetic element 36 and the second magnetic element 28 (as shown in FIG. 2). Therefore the slide block 20 will be moved toward the left side wall 38a of the base 30. The second lens 24 will be moved and positioned at an operative state with its optical path aligning with the focusing optical path A of the CCD (as shown in FIG. 3) of the scanner.

It thus can be seen, according to this invention, a few number of magnetic components and a guide rod can effectively switch the lenses for different resolution in a scanner. The complicated structure of motor, chain, belt, gears and sensors used in the prior art dual-lens scanner can be dispensed with. It is simple in structure and less expensive in production and assembly. The magnetic components of the present invention are also more reliable and trouble free than the conventional motor and chain. The service life thus can be longer, and the repairs and maintenance cost will be lower.

The preferred embodiment of the present invention described above only serves as an example. Many modifications and variations may be made, such as the first and second magnetic elements may be changed to electromagnetic elements. Instead of a pair of magnetic elements and electromagnetic elements, two or more pairs of magnetic elements and electromagnetic elements may be used. In addition, the guide rod may be changed to a linear bearing and the through hole of the slide block may be changed to an inverse U-shaped slot.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

We claim:

1. A lens switching apparatus for a dual-lens optical scanner equipped with
   a CCD for image processing, comprising:
   a base equipped with two side walls and a concave section formed between the side walls;
   a slide block located on the concave section and moveable between the side walls of the base;
   a first optical lenses and a second optical lenses arranged on the slide block with different magnification;
   a guide means for guiding the slide block between the side walls of the base;
   a plurality of magnetic elements arranged on side walls of the slide block; and
   a plurality of electromagnetic elements arranged on the side walls of the base, corresponding to the magnetic elements of the slide block respectively, to move the slide block along the guide means by magnetically actuating the electromagnetic elements.

2. The lens switching apparatus as claimed in claim 1, wherein the guide means comprises a plurality of transverse through holes formed in the slide block and a plurality of guide rods arranged to cross the side walls of the base and to run through the through holes of the slide block respectively.

3. The apparatus as claimed in claim 2, wherein the through holes of the slide block is linear bearing.

4. The apparatus as claimed in claim 2, wherein the through holes of the slide block is in a form of inverse U-shaped slot.

5. The apparatus as claimed in claim 1, wherein the magnetic elements arranged on the side walls of the slide block are electromagnetic elements.

* * * * *